United States Patent [19]

Obermann

[11] Patent Number: 4,648,277

[45] Date of Patent: Mar. 10, 1987

[54] PRESSURE RESPONSIVE ASSEMBLY

[75] Inventor: George Obermann, Niles, Ill.

[73] Assignee: Eaton Corporation, Cleveland, Ohio

[21] Appl. No.: 808,194

[22] Filed: Dec. 12, 1985

[51] Int. Cl.[4] .............................................. G01L 9/02
[52] U.S. Cl. ....................................... 73/725; 73/115;
         200/83 R; 200/308; 338/42; 340/60
[58] Field of Search .......................... 73/725, 714, 115;
         340/60; 338/42, 41, 39; 200/83 R, 83 S, 83 SA,
         308

[56] References Cited

U.S. PATENT DOCUMENTS

| | | | |
|---|---|---|---|
| 2,423,609 | 7/1947 | Middleton et al. | 73/725 |
| 3,069,645 | 12/1962 | Henke | 73/725 |
| 3,445,801 | 5/1969 | Sattler | 338/42 |
| 3,504,324 | 3/1970 | Creager | 73/725 |
| 3,956,920 | 5/1976 | Killmeyer | 73/725 |
| 4,449,112 | 5/1984 | Gould | 73/115 |
| 4,449,113 | 5/1984 | Gould et al. | 73/115 |
| 4,581,941 | 4/1986 | Obermann et al. | 73/115 |

Primary Examiner—Donald O. Woodiel
Attorney, Agent, or Firm—D. A. Rowe; R. A. Johnston

[57] ABSTRACT

A pressure responsive assembly including an actuator rod coupled to a pressure source through a rolling type diaphagm. The other end of the actuator rod is connected to a wiper assembly. A first part of the wiper assembly contacts a coil of resistance wire to provide a first signal indicative of the pressure. A second part of a wiper assembly moves into and out of contact with a switch contact pad as the sensed pressure crosses a predetermined threshold value.

9 Claims, 5 Drawing Figures

PRESSURE RESPONSIVE ASSEMBLY

BACKGROUND OF THE INVENTION

This invention relates to pressure measuring apparatus and, more particularly, to such apparatus which provides both a switching function at a predetermined pressure and an analog signal function over a range of pressures including the predetermined pressure.

In an automobile, one of the operating conditions that is monitored is the oil pressure. In many cars, there is provided on the dashboard both an oil pressure gauge for indicating the oil pressure and an "idiot" light which is lit when the engine is on and the oil pressure is below a predetermined threshold. Conventionally, these functions have been implemented with separate assemblies performing the two functions. It is therefore an object of the present invention to provide a single assembly to provide both the switching and analog signal functions in response to oil pressure.

It is another object of the present invention to provide such an assembly wherein adjustments may be made separately to both the switching threshold and the analog function zero level.

It is a further object of this invention to provide such an assembly which is easily assembled from subassemblies and wherein the interconnection of electrical components is easily and inexpensively performed.

SUMMARY OF THE INVENTION

The foregoing and additional objects are attained in accordance with the principles of this invention by providing a pressure responsive assembly for providing an analog electrical signal indicative of a sensed pressure value and a switch change of state upon the sensed pressure crossing a predetermined threshold value comprising an electrically insulated housing having a chamber therein, the chamber being defined by an interior wall, a first conductive terminal member extending into the chamber along the interior wall, a second conductive terminal member extending into the chamber along the interior wall, the second terminal member being spaced from the first terminal member and having a switch contact pad thereon, an electrically insulated bobbin member extending into the chamber and spaced from the interior wall, a resistance element on the outside of the bobbin member, connecting means for electrically connecting an end of the resistance element to the first terminal member, pressure sensing means having a member adapted for displacement relative to the bobbin member in response to magnitude variations of a sensed pressure, a wiper assembly carried by the pressure sensing means member for movement therewith and including a first conductive finger adapted for wiping electrical contact with the resistance element and a second conductive finger adapted for wiping contact with the interior wall into and out of electrical contact with the switch contact pad as the magnitude of the sensed pressure crosses the predetermined threshold value, and means for maintaining the wiper fingers at a reference voltage.

BRIEF DESCRIPTION OF THE DRAWINGS

The foregoing will be more readily apparent upon reading the following description in conjunction with the drawings in which like elements in different figures thereof have the same reference character applied thereto and wherein.

DETAILED DESCRIPTION

Figure 1:
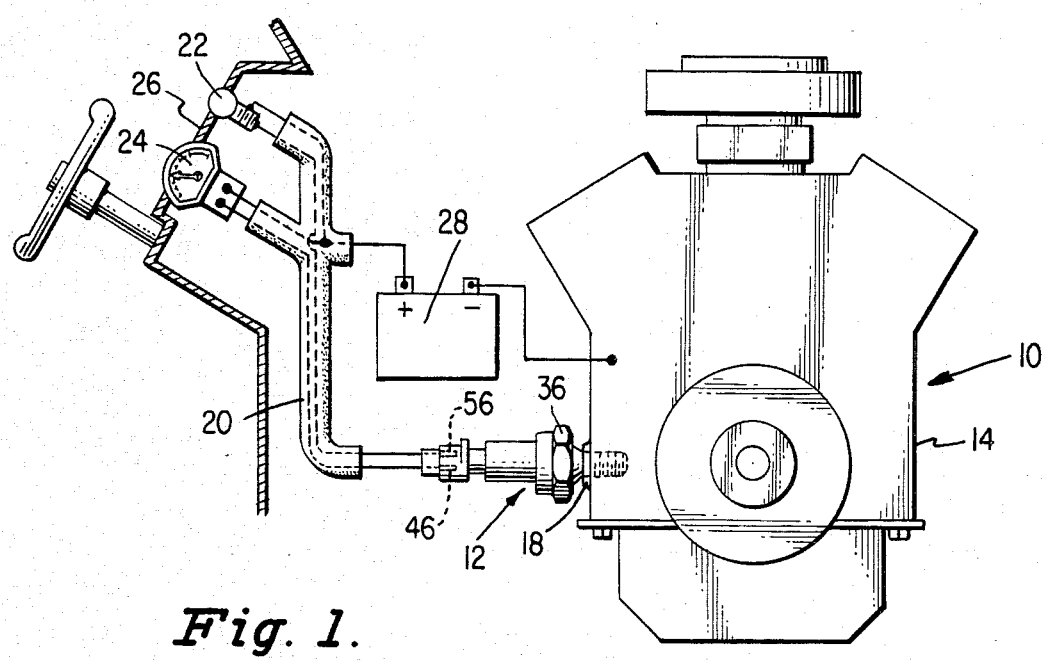
FIG. 1 schematically illustrates an installation in an automobile of an assembly constructed in accordance with the principles of this invention.

Referring now to the drawings, FIG. 1 schematically depicts an automobile engine, designated generally by the reference numeral 10, in which an assembly 12 constructed in accordance with the principles of this invention is installed. The assembly 12 is screwed into the engine block 14 through an opening 16 in a boss 18 through which it communicates with the oil lubrication system of the engine 10. The sensor assembly 12 is connected via a wiring harness 20 to a low pressure warning ("idiot") light 22 and an oil pressure gauge 24 mounted on the dashboard 26 of the automobile. The wiring harness 20 is also connected to the automobile battery 28 for providing power for the assembly 12, the lamp 22, and the gauge 24.

Figure 2:
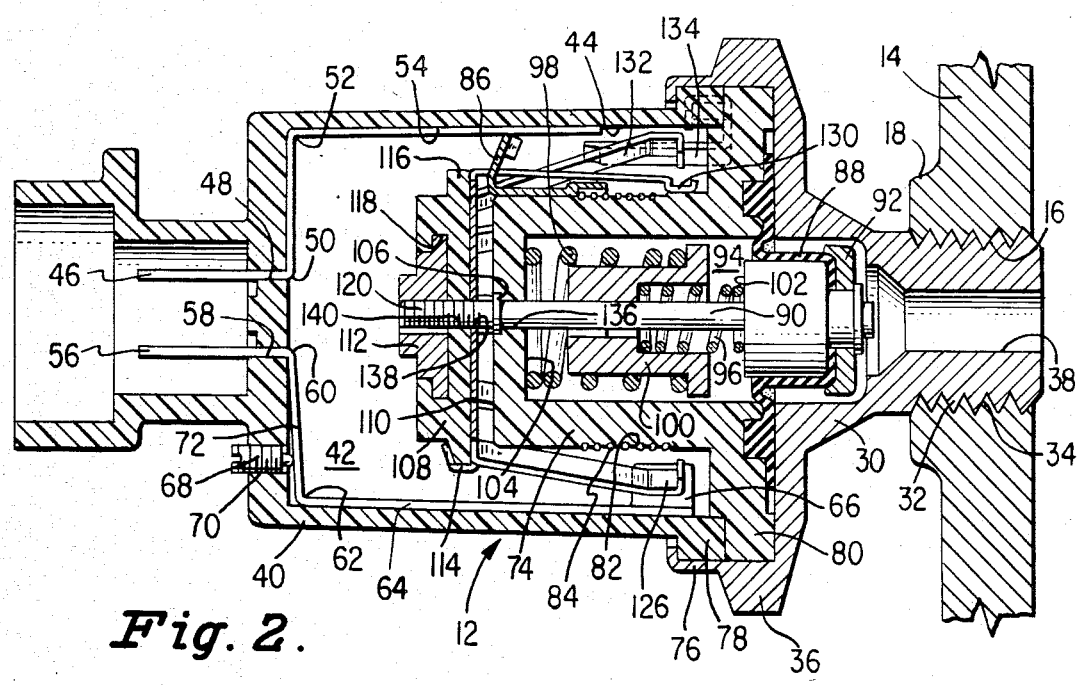
FIG. 2 is a longitudinal cross-sectional view of an assembly according to this invention showing the condition of the assembly at zero pressure.

Referring now to FIG. 2, the assembly 12 includes an adapter 30 having external threads 32 adapted to be screwed into the threads 34 of the opening 16 in the boss 18. For ease in securing the assembly 12 to the engine block 14, the adaptor 30 is formed with a hexagonally shaped region 36 (FIG. 1) which may be held by an installation wrench. The adaptor 30 is further formed with a bore 38 which provides fluid communication between the oil lubrication system of the engine 10 and the assembly 12. The adaptor 30 is formed of an electrically conductive material so that the assembly 12 is grounded to the engine block 14.

The assembly 12 further includes an electrically insulated housing 40 which preferably is generally cylindrical in shape. The housing 40 is hollow so as to have a chamber 42 therein, which chamber 42 is defined by a generally cylindrical interior wall 44. Although the wall 44 is shown as having a single cylindrical surface, it is understood that the wall 44 can comprise any number of surfaces, if such is desired. A first conductive terminal member 46 extends into the chamber 42 through an opening 48 and is bent at 50 and 52 so that the portion 54 lies alongside the interior wall 44. Similarly, a second conductive terminal member 56 extends into the chamber 42 through an opening 58 and is bent at 60 and 62 so that the portion 64 extends alongside the interior wall 44. The second terminal member 56 is spaced from the first terminal member 46, illustratively being diametrically opposed therefrom within the chamber 42. At the far end of the portion 64, the second terminal member 56 is formed with a switch contact pad 66 thereon. The switch contact pad 66 is generally of rectangular configuration and is curved so that it lies against the cylindrical interior wall 44. An exterior threaded adjusting screw 68 extends through an interior threaded opening 70 in the housing 40 and abuts against the portion 72 of the second terminal 56 which is substantially transverse to the interior wall 44. The terminal member 56 is formed of a naturally resilient material so that its resiliency keeps the transverse portion 72 in contact with the adjusting screw 68 while at the same time keeping the pad 66 in contact with the wall 44. Thus, threading the screw 68 into and out of the housing 40 causes the switch contact pad 66 to be moved along the interior wall 44.

The assembly 12 also includes an electrically insulated bobbin member 74 which extends into the chamber 42 and is spaced from the interior wall 44. The adaptor 30, the housing 40, and the bobbin member 74 are held together by having the cylindrical wall 76 of the adaptor 30 crimped over the shoulder 78 of the housing 40, with the shoulder 80 of the bobbin member 74 captured between the shoulder 78 and the adaptor 30. The bobbin member 74 is formed with a helical groove 82 on its outside surface and a resistance wire 84 is wound around the bobbin member 74 within the helical groove 82. The starting end of the resistance wire 84 is held by a standoff (not shown) formed in the bobbin member 74 and a conductive clip 86 captured within a groove provided therefor in the bobbin member 74 holds the finish end of the coil of resistance wire 84. The clip 86 is of resilient material and extends outwardly from the bobbin member 74 resiliently into electrical contact with the portion 54 of the first terminal member 46.

Pressure sensing is accomplished by a diaphragm-actuator rod subassembly including a diaphragm 88 and an actuator rod 90. The circular bead portion of the diaphragm 88 is compressed between the bobbin member 74 and the adaptor 30, providing a seal between the bore 38, which communicates with the lubrication system of the engine 10, and the remainder of the assembly 12. The other area that requires a seal is where the diaphragm 88 is mounted on the actuator rod 90. This is accomplished by placing the diaphragm washer 92 over the diaphragm 88 and stacking the center extension of the actuator rod 90 over the washer 92. This operation provides sufficient compression of the diaphragm 88 material, making a reliable seal between the two sides of the diaphragm 88. It is preferable to use a rolling diaphragm because such an element provides a tough and flexible seal with a unique configuration that permits relatively long actuator rod strokes while completely eliminating sliding friction.

The bobbin member 74 contains the diaphragm-actuator rod subassembly. This subassembly is within a chamber 94 formed within the bobbin member 74 and extends through the bobbin member 74 into the housing chamber 42. The chambers 94 and 42 are sealed from the lubrication system of the engine 10 by the diaphragm 88, as discussed above. The diaphragm-actuator rod subassembly includes a pair of springs 96 and 98, and a spring seat 100, all surrounding the actuator rod 90 and within the bobbin chamber 94. As is clearly shown in FIGS. 2-4, the spring 96 is between the spring seat 100 and the shoulder 102 of the actuator rod 90, and the spring 98 is between the spring seat 100 and the wall 104 of the bobbin member 74. A retaining ring 106 mounted in a groove provided therefor on the actuator rod 90 prevents the springs 96 and 98 from moving the actuator rod 90 any further to the right than the position shown in FIG. 2.

Mounted on the end of the actuator rod 90 to the left of the retaining ring 106 is a contact wiper subassembly which includes a carrier member 108, a wiper 110, and an adjusting nut 112. The wiper 110 is of conductive material and is held on the non-conductive carrier member 108 by a plurality of tabs 114 crimped over the shoulder 116 of the carrier member 108 in notches provided therefor. The adjusting nut 112 is captured within a recess 118 in the carrier member 108. The recess 118 is open at one side thereof (not shown) so that the adjusting nut 112 may be slid into the recess 118. The recess 118 is shaped to allow rotation of the adjusting nut 112 but to prevent movement of the adjusting nut 112 relative to the carrier member 108 in the left-to-right direction, as viewed in FIGS. 2-4. The end 120 of the actuator rod 90 to the left of the retaining ring 106 is externally threaded so that the adjusting nut 112 may be threaded thereon. The wiper 110 is formed with a plurality of resilient fingers 122, 124, 126, 128, 130 and 132. At the ends of each of the fingers 122-132, the fingers are bent to form a wiping contact. The first group of fingers 122, 124, 128 and 130 are bent inwardly so that they are in wiping electrical contact with the resistance wire 84. The finger 126 is bent outwardly into wiping contact with the interior wall 44 of the chamber 42, its path of movement being aligned with the switch contact pad 66. The finger 132 is biased outwardly toward the wall 44 but contacts a conductive grounding clip 132. The clip 134 is crimped over the shoulder 78 of the housing 40 in a groove provided therefor and is in electrical contact with the adapter 30, which in turn is in electrical contact with the engine block 14.

The threaded end 120 of the actuator rod 90 and a portion of the actuator rod 90 to the right of the retaining ring 106 are formed with a flat thereon and the opening 136 in the bobbin 74, the opening 138 in the wiper 110 and the opening 140 in the carrier member 108 are all D-shaped so that there can be no relative rotation between the actuator rod 90, the bobbin 74, the wiper 110 and the carrier member 108.

The electrical connection of the assembly 12 is shown in FIG. 1. Thus, the first terminal 46 is connected to one side of the oil pressure gauge 24 and the second terminal 56 is connected to one side of the low oil pressure indicator light 22. The other sides of the gauge 24 and the light 22 are connected to the positive terminal of the automobile battery 28. The negative terminal of the battery 28 and the adaptor 30 of the assembly 12 are both grounded to the engine block 14.

Figure 3:
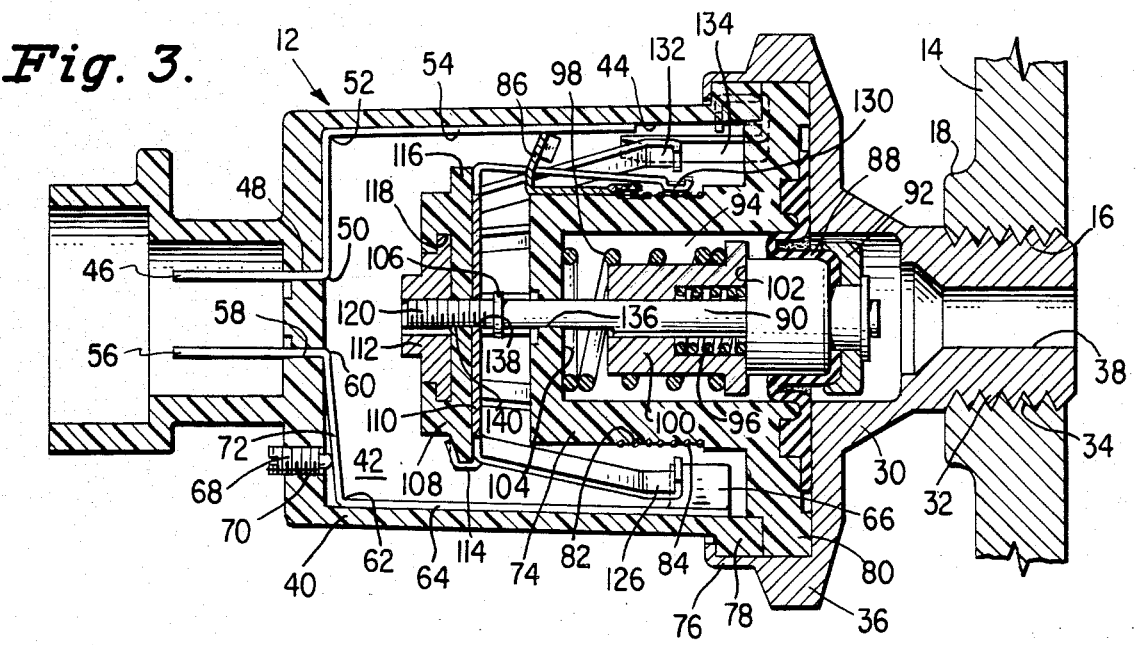
FIG. 3 is a longitudinal cross-sectional view similar to FIG. 2 showing the condition of the assembly at a pressure slightly less than the predetermined threshold pressure.
Figure 4:
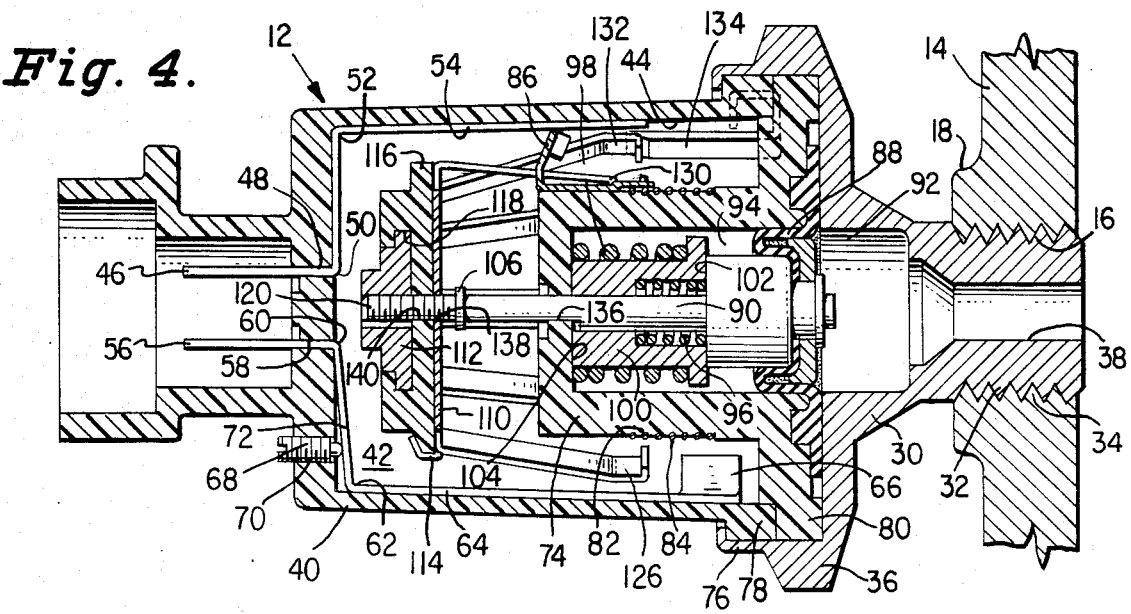
FIG. 4 is a longitudinal cross-sectional view similar to FIG. 2 showing the condition of the assembly at a pressure greater than the threshold pressure.
Figure 5:
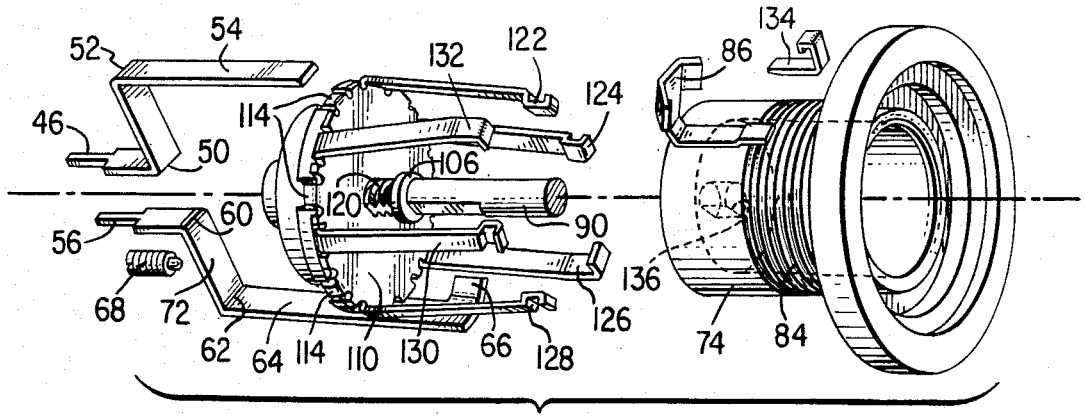
FIG. 5 is an exploded perspective view showing details of the electrical components of the assembly according to this invention.

The operation of the sensor assembly will now be described. With the engine 10 not running, there is no oil pressure in the engine's fluid lubrication system and the condition of the assembly 12 is as shown in FIG. 2. In this condition, the springs 96 and 98 push the diaphragm-actuator rod subassembly as far to the right as the retaining ring 106 will allow it to go. In this condition, the conductive finger 126 is in contact with the switch contact pad 66 and the conductive fingers 122, 124, 128 and 130 are as far to the right on the bobbin member 74 as is possible so they are out of contact with the resistance wire 84. There is thus an open circuit path from the first terminal 46, through the clip 86, through the resistance wire 84, along the insulated bobbin member 74, through the fingers 122, 124, 128 and 130, through the finger 132, through the grounding clip 134, through the adaptor 30, and to the grounded engine block 14. There is a conductive path from the second terminal 56, through the pad 66, through the finger 126, through the finger 132, through the grounding clip 134, through the adapter 30, and to the grounded engine block 14. Thus, if battery power was applied to the system, the low oil pressure light 22 would be lit and the oil pressure gauge 24 would register its minimum value, i.e., no pressure. FIG. 3 illustrates the condition where the engine 10 is running, but the oil pressure is still low. In this condition, the oil pressure moves the diaphragm-actuator rod subassembly toward the left, compressing the spring 96. The finger 126 is shown to be still in contact with the switch contact pad 66, although it is about to be moved out of contact therewith, so that the light 22 is still lit. The fingers 122, 124, 128 and 130 have moved into contact with the resistance wire 84 so that the circuit to the oil pressure gauge 24 is closed but with relatively high resistance so the oil pressure gauge 24 registers a low value of oil pressure. FIG. 4 illustrates the condition of maximum oil pressure where the finger 126 is out of contact with the switch contact pad 66 to open the circuit to the light 22. The fingers 122, 124, 128 and 130 are as far left along the resistance wire 84 as they can possibly go so that there is minimum resistance in the circuit to the gauge 24, which thereby registers a maximum value. It should be pointed out that at no time does the finger 132 go out of contact with the clip 134. As the oil pressure decreases, the assembly goes from the condition shown in FIG. 4 to the condition shown in FIG. 3 and then to the condition shown in FIG. 2.

As shown and described, the assembly 12 includes two springs 96 and 98. These springs are chosen to have different spring rates, with the spring 96 having a lower spring rate than the spring 98. Accordingly, it takes less force to compress the spring 96, which then is fully compressed before the spring 98 starts to be compressed. This provides two ranges of sensitivity of the assembly.

To calibrate the assembly 12, the low oil pressure switching threshold is adjustable by means of the screw 68. The adjusting nut 112 is utilized to set the starting resistance value of the assembly 12.

Accordingly, there has been disclosed an improved pressure responsive assembly. It is understood that the above-described embodiment is merely illustrative of the application of the principles of this invention. Numerous other embodiments may be devised by those skilled in the art without departing from the spirit and scope of this invention, as defined by the appended claims.

I claim:

1. A pressure responsive assembly for providing an analog electrical signal indicative of a sensed pressure value and a switch change of state upon the sensed pressure crossing a predetermined threshold value, comprising:
    an electrically insulated housing having a chamber therein, said chamber being defined by an interior wall;
    a first conductive terminal member extending into said chamber along said interior wall;
    a second conductive terminal member extending into said chamber along said interior wall, said second terminal member being spaced from said first terminal member and having a switch contact pad thereon;
    an electrically insulated bobbin member extending into said chamber and spaced from said interior wall;
    a resistance element on the outside of said bobbin member;
    connecting means for electrically connecting an end of said resistance element to said first terminal member;
    pressure sensing means having a member adapted for displacement relative to said bobbin member in response to magnitude variations of a sensed pressure;
    a wiper assembly carried by said pressure sensing means member for movement therewith and including:
    a first conductive finger adapted for wiping electrical contact with said resistance element; and
    a second conductive finger adapted for wiping contact with said interior wall into and out of electrical contact with said switch contact pad as the magnitude of the sensed pressure crosses said predetermined threshold value; and
    means for maintaining said wiper fingers at a reference voltage.

2. The assembly according to claim 1 wherein said connecting means includes a resilient conductive clip mounted on said bobbin member in electrical contact with said end of said resistance element and extending outwardly from said bobbin member resiliently into electrical contact with said first terminal member.

3. The assembly according to claim 1 wherein said bobbin member has a hollow interior open at both ends and said pressure sensing means member includes a rod extending through the hollow interior of said bobbin member into said chamber with said wiper assembly mounted on said rod within said chamber.

4. The assembly according to claim 3 further including means for adjusting the position of said wiper assembly on said rod so as to set the analog electrical signal for one predetermined pressure value.

5. The assembly according to claim 4 wherein said adjusting means includes a threaded portion of said rod and an adjustment nut carried by said wiper assembly.

6. The assembly according to claim 3 wherein said rod includes an outwardly extending shoulder and the pressure sensing means further includes a spring seat member surrounding said rod, a first spring surrounding said rod having a first end abutting said shoulder and a second end abutting said spring seat member, and a second spring surrounding said rod having a first end abutting said spring seat member and a second end abutting said bobbin member.

7. The assembly according to claim 1 further including means for adjusting the extension of said second terminal member within said chamber to vary the position of said switch contact pad so as to selectively set said predetermined threshold value of sensed pressure.

8. The assembly according to claim 7 wherein said second terminal member is formed of resilient material and has a portion extending transverse to said interior wall and said adjusting means includes an adjusting screw threadedly extending through said housing into contact with the transverse portion of said second terminal member, the resiliency of said second terminal member biasing said transverse portion into contact with said adjusting screw.

9. The assembly according to claim 1 wherein the reference voltage maintaining means includes:
    a conductive strip mounted on said interior wall;
    a third conductive finger on said wiper assembly adapted for wiping electrical contact with said conductive strip; and
    means for applying said reference voltage to said conductive strip.

* * * * *